UNITED STATES PATENT OFFICE 2,069,486

PREVENTION OF EFFLORESCENCE ON SILICATE FILMS

Paul S. Tilden, New York, N. Y.

No Drawing. Application June 16, 1934, Serial No. 730,915

5 Claims. (Cl. 91—68)

This invention relates to the prevention of efflorescence or bloom upon silicate films and is particularly applicable to films or coatings of soluble silicates and to paints in which soluble silicates are used as a vehicle. Such films, coatings, vehicles and the like will be generally referred to herein, for convenience, as films and the compositions themselves will be referred to as coating compositions, but it is to be understood that this terminology is not intended as a limitation of the invention to any specific form or use of the silicates.

Silicate films are useful, for example, as coverings for brick, lime plaster, or concrete surfaces, mineral surfaced composition roofing materials, shingles having a surface of hydraulic cement, or the like, and for acoustical board and interior and exterior wall, fresco, and mural decoration. However, it has been found that when films of soluble silicates such as sodium or potassium silicates are exposed to heat and moisture, a white coating of crystals tends to form and may cover the film unevenly in spots and produce an unsatisfactory appearance. This action is commonly designated as efflorescence or bloom. It may be caused by the moisture penetrating the silicate film and causing solution of certain particles of the soluble silicates which may thus be brought to the surface and may then be converted to white carbonate crystals by the carbon-dioxide of the atmosphere. Efflorescence is particularly noticeable on colored surfaces because of the contrast between the white crystals and the colored surface.

In certain instances silicate films have been washed and otherwise treated with acids or acidic compounds to reduce the solubility of the silicates in an effort to prevent or retard efflorescence. Such procedure however, has not been entirely satisfactory inasmuch as efflorescence is not entirely prevented thereby and the strength of the binder or the color of some pigments may be affected by the acid treatment.

It is accordingly an object of the present invention to improve the characteristics of soluble silicate films.

Another object is to prevent efflorescence on such films.

Another object is to render such films suitable as vehicles for colored paints.

Another object is to provide a simple, convenient and dependable means for accomplishing the above purposes.

The invention also consists in the new and novel features of operation and the new and original arrangements and combinations of steps hereinafter described and more particularly set forth in the appended claims.

In accordance with the present invention I have found that various aldehydes, amines, amides and their derivatives have the property of substantially preventing bloom on soluble silicate films. These substances may be added to the silicate solution before it is applied to the surface as a covering, or in some instances, they may be applied to the film as a separate wash.

More specifically I have found that aldehydes and amino compounds, for example, formaldehyde, acetaldehyde, furfuraldehyde, formamide, acetamide and hexamethylene-tetramine (formin), when used in the manner hereinafter set forth, are particularly suitable for the above purposes. The particular substance may be prepared as a solution or dispersion, depending upon its properties, and is added to the silicate solution in suitable quantities to effect the desired result. Usually a small percentage is sufficient for the purpose and if the substance tends to precipitate the silica, the percentage should not be sufficiently great to cause substantial precipitation. The silicate solution with the above substance incorporated therein may be applied to a surface in the usual manner and the film thus produced will permanently retain its color and resist efflorescence. The reason for this action is not definitely known but it has been suggested that the action may be due to dehydration of the sodium carbonate by the aldehyde or the like.

The percentage of anti-bloom solution may vary widely under different conditions depending upon the particular silicate, concentration of silicate, thickness of final film, conditions of use, etc. For example, formaldehyde, formamide and acetamide may be used from a minimum of about 2% or 3% of the silicate solution to a maximum depending upon the type of silica in the solution and, in any event, less than the amount that would cause precipitation of the silica. Furfuraldehyde may be used in various quantities above about 3% and is not definitely limited in percentage inasmuch as it does not tend to precipitate silica when larger amounts are used. Formin may be used in quantities above about 5%.

The following are given as specific examples which have been found satisfactory in particular instances:

*Example 1.*—10 cc. of commercial (40% solution) formaldehyde was added to 50 cc. of water and mixed thoroughly, this was then added to 50 cc. of sodium silicate at 42° Bé. while agitating vigorously to prevent precipitation of the silicate. This mixture is suitable as a vehicle for paint and if, for example, a green paint is desired, 20 g. of chromium oxide may be added to constitute the pigment. The vehicle may be used with any of the various pigments which are suitable for silicate paints, or may be used without pigments as a coating. The resulting film permanently retains its surface characteristics and resists efflorescence.

Example 2.—7 cc. of furfuraldehyde was added to 50 cc. of water and heated until the furfuraldehyde layer disappeared. The mixture was then cooled and added to 50 cc. of 40° Bé. sodium silicate and stirred to form a dispersion.

Example 3.—5 g. of acetamide was dissolved in 50 cc. of cold water and added to 50 cc. of 40° Bé. sodium silicate while agitating to prevent precipitation of silicate.

Example 4.—5 g. of formin was used in the manner and proportions set forth in Example 3.

In all of the above examples the resulting silicate solution constitutes a coating composition which may be stored and later applied to a surface to form a silicate film. The organic material above mentioned prevents efflorescence or bloom on the film so obtained. The film accordingly has the desired properties of a permanent paint or coating and may be used in any desired color without danger of subsequent discoloration.

Formaldehyde is the most readily available in commercial quantities of the above substances and is comparatively cheap. Solutions containing formaldehyde however, have a disagreeable odor which may render their use for interior purposes undesirable although the odor does not interfere with their use on external surfaces where the tendency to effloresce is greatest.

Acetaldehyde, while suitable from a chemical standpoint, is difficult to handle and possesses a suffocating odor. Furfuraldehyde is not readily soluble and may accordingly be used with known reagents such as triethanolamine and oleic acid to assist in obtaining an emulsion. It is contemplated that the substance will be selected with regard to its commercial availability, cost, economy of operation, the type of silicate used and the required characteristics in each particular instance.

In certain instances the anti-bloom material may be applied to the film as a separate wash instead of being incorporated in the original silicate solution. For this purpose the silicate solution is first applied to the surface in the usual manner and, as soon as it is set sufficiently, the wash is applied thereto. It has been found that certain known materials which retard blooming, for example, acids or acid salts such as calcium chloride or ammonium chloride or sodium bichromate, assist the action of the organic material above mentioned. They may be incorporated directly in the wash solution or may be applied as a separate wash, as desired.

It is possible that these acids or acidic salts penetrate the film and assist in obtaining the necessary contact of the aldehyde or aldehyde derivative with the silicate particles throughout the film.

The separate application of the anti-bloom solution in this manner may be desirable in certain instances, but the incorporation thereof directly in the silicate solution ensures a uniform product without requiring special operations in the application of the coating composition to a surface.

The silicate films formed in the manner above described are particularly useful as coverings for Portland cement in which case the silicate film tends to prevent cement bloom, possibly by setting up insoluble silicates with the lime as well as by forming a protective coating over the surface thereof, while the silicate bloom is prevented by the organic material above described.

Obviously the invention is not limited to any particular silicate film. Various soluble silicates or combinations thereof may be used in accordance with the properties required. Furthermore the silicate solution may be used as a coating composition, with or without pigments, for any purpose for which silicate films are suitable.

Although certain specific substances have been referred to by way of example, it is obvious that the invention is not to be limited thereby but is only to be construed in accordance with the following claims when interpreted in view of the prior art.

I claim:

1. A coating composition comprising a soluble silicate and an efflorescence inhibiting substance selected from the group consisting of formaldehyde, acetaldehyde, furfuraldehyde, acetamide, formamide and formin in amount sufficient to produce when dry a film capable of substantially permanently retaining its surface characteristics and resist efflorescence.

2. A coating composition comprising a soluble silicate selected from the group consisting of sodium silicate and potassium silicate and an efflorescence inhibiting substance comprising formaldehyde in amount sufficient to produce when dry a film capable of substantially permanently retaining its surface characteristics and resist efflorescence.

3. A coating composition comprising a soluble silicate, coloring pigment, and an efflorescence inhibiting substance selected from the group consisting of formaldehyde, acetaldehyde, furfuraldehyde, acetamide, formamide and formin in amount sufficient to produce when dry a film capable of substantially permanently retaining its surface characteristics and resist efflorescence.

4. A coating composition comprising formaldehyde 40% solution, water, and sodium silicate 42° Bé. in substantially the following proportions, 10 c. c. formaldehyde, 50 c. c. water and 50 c. c. sodium silicate.

5. An article of manufacture comprising a base and a hardened film thereon comprising a soluble silicate and an efflorescence inhibiting substance selected from the group consisting of formaldehyde, acetaldehyde, furfuraldehyde, acetamide, formamide, and formin in amount sufficient to produce when dry a film capable of substantially permanently retaining its surface characteristics and resist efflorescence.

PAUL S. TILDEN.